(No Model.)
G. R. WIGHT.
REFRIGERATING APPARATUS.
No. 275,556. Patented Apr. 10, 1883.
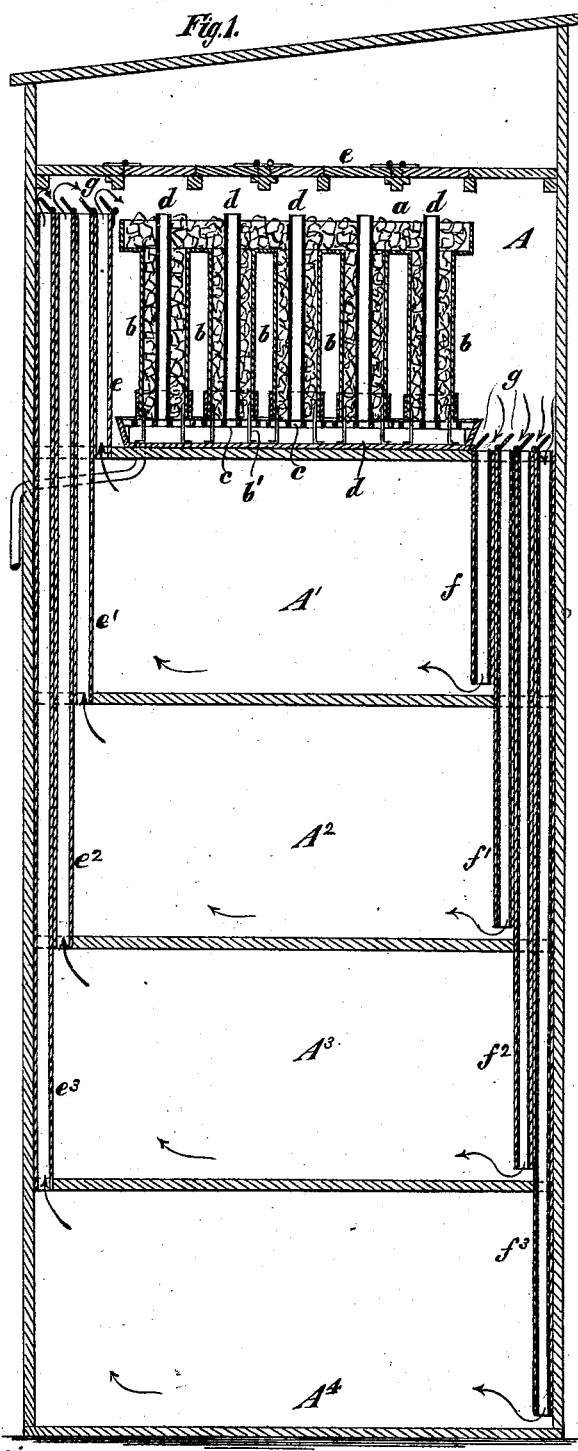
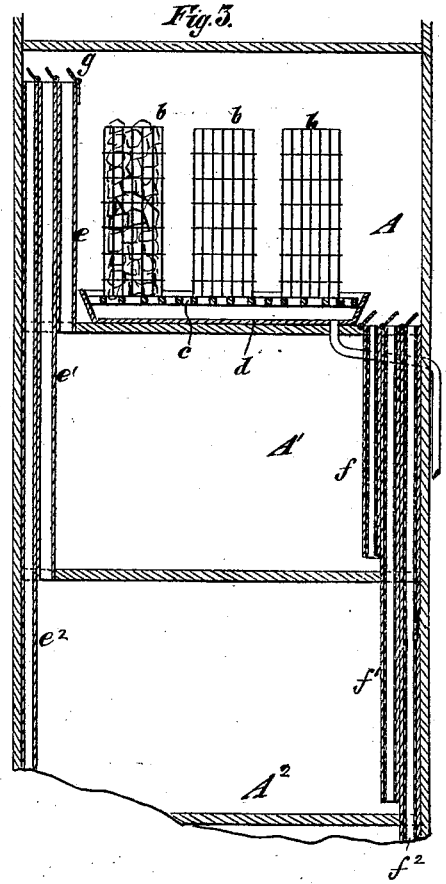
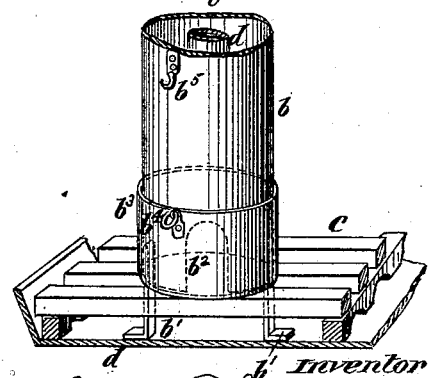
Witnesses
James R Bowen
T. H. Keane
Inventor
George R. Wight
by his attorney
Edwin H. Brown.

UNITED STATES PATENT OFFICE.

GEORGE R. WIGHT, OF NEW YORK, N. Y.

REFRIGERATING APPARATUS.

SPECIFICATION forming part of Letters Patent No. 275,556, dated April 10, 1883.

Application filed December 18, 1882. (No model.)

*To all whom it may concern:*

Be it known that I, GEORGE R. WIGHT, of New York, in the county and State of New York, have invented a certain new and useful Improvement in Refrigerative Apparatus, of which the following is a specification.

This improvement relates to apparatus which is employed as a fixture in buildings.

The improvement will be described in detail, and then pointed out in the claims.

In the accompanying drawings, Figure 1 is a vertical section of a building embodying my improvement. Fig. 2 is an enlarged view of a portion of the refrigerative apparatus, and Fig. 3 is a sectional view illustrating a refrigerating apparatus of modified form.

Similar letters of reference designate corresponding parts in all the figures.

A designates the upper floor of a building, and $A'$ $A^2$ $A^3$ $A^4$ designate the several floors below it.

In the upper floor is a refrigerating apparatus, consisting of one or more ice-tanks, $a$, and a number of isolated pipes, $b$, communicating therewith at the upper ends. The tank or tanks and the pipes may be made of galvanized sheet-iron. The lower ends of the pipes rest on a grating, $c$, which may be made of wood or other suitable material, and as they are open the ice contained therein will be supported upon the grating.

Below the grating are drip-pans $d$, which catch the water formed by the melting of the ice. These drip-pans may be slid out from under the grating, if desirable, or they may be provided with drain-pipes for carrying off the water. The pipes $b$ are provided with feet $b'$, which extend through the grating $c$ and are supported on the drip-pans. The pipes $b$ are provided with small inner pipes, $d$, or groups of rods, for maintaining passages through which air may circulate within the ice in the said pipes $b$.

A platform, $e$, is arranged over the ice-tanks and provided with openings, through which ice can be introduced into the tanks $a$. Persons whose duty it is to fill the tanks may walk or crawl over this platform.

At the lower ends the pipes $b$ have side openings, $b^2$, and are fitted with annular doors $b^3$, which normally rest on the grating $c$, but may be slid up on the pipes to uncover the openings. These doors are provided with eyes $b^4$, which may be slipped over hooks $b^5$, affixed to the pipes $b$, to support the doors. Access is thus afforded to the lower ends of the pipes for the purpose of cleaning them out.

Ducts or passages $f f' f^2 f^3$ extend from the bottom portion of the floor A to the bottom portions of the floors $A'$ $A^2$ $A^3$ $A^4$ below. Other ducts, $e e' e^2 e^3$, extend from the top portion of the floors $A'$ $A^2$ $A^3$ $A^4$ to the top portion of the floor A. The cool air in the bottom portion of the floor A descends to the bottom portion of the floors $A'$ $A^2$ $A^3$ $A^4$, and the warmer air in the floors $A'$ $A^2$ $A^3$ $A^4$ passes from the top portion thereof to the top portion of the floor A.

The inner walls of the ducts or passages $f f'$ $f^2 f^3$ and $e e' e^2 e^3$ are preferably covered with felt or other material which is a good non-conductor of heat, so that the temperature of the air passing through them shall be maintained until it arrives at the floors where it is to be delivered and utilized.

The upper ends of the ducts or passages are provided with doors $g$, which are shown as hinged in place, and serve to control and regulate the passage of air between the floors A $A'$ $A^2$ $A^3$ $A^4$.

The refrigerating apparatus shown in Fig. 2 differs from that already described in that it consists of a number of isolated cage-like receptacles, $b$.

What I claim as my invention, and desire to secure by Letters Patent, is—

1. The combination, with a building, of ducts or passages leading from the bottom portion of an upper floor to the bottom portion of several floors below, other ducts or passages leading from the top portion of the lower floors to the top portion of the upper floor, and a refrigerating apparatus arranged on the upper floor and comprising a number of ice-receptacles arranged at such distances apart that air may circulate freely between them, and so constructed that air may pass through them, substantially as specified.

2. The combination, with a building, of ducts or passages leading from the bottom portion of an upper floor to the bottom portion of several floors below, other ducts or passages leading from the top portion of the lower floors to the top portion of the upper floor, and a refrigerating apparatus arranged on the upper floor, and consisting of an ice tank or tanks and a number of pipes extending downwardly therefrom nearly to the floor, containing ice, and so constructed that air may pass downwardly through them in contact with the ice contained in them, substantially as specified.

3. The combination, with a building, of ducts or passages leading from the bottom portion of an upper floor to the bottom portion of several floors below, other ducts or passages leading from the top portion of the lower floors to the top portion of the upper floor, a refrigerating apparatus arranged on the upper floor, and felt or other material which is a good non-conductor of heat applied to the inner walls of the ducts or passages, substantially as specified.

4. The combination, with a building, of ducts or passages leading from the bottom portion of an upper floor to the bottom portion of several floors below, other ducts or passages leading from the top portion of the lower floors to top portion of the upper floor, a refrigerating apparatus arranged on the upper floor, and a platform over this apparatus on which persons may walk or move when filling the apparatus, and which is provided with openings, through which ice may be introduced downwardly into the apparatus, substantially as specified.

5. The combination, with a building, of ducts or passages from the bottom portion of an upper floor to the bottom portion of several floors below, other ducts or passages leading from the top portion of the lower floors to the top portion of the upper floor, a refrigerating apparatus on the upper floor, comprising a number of isolated ice-receptacles open at the lower end, a grating below the lower ends of the ice-receptacles, serving to support the ice therein, and one or more drip-pans arranged below the grating, substantially as specified.

6. In a refrigerating apparatus, the combination, with a number of isolated pipes having openings in their sides, of annular sliding doors fitted thereto, substantially as specified.

7. In a refrigerating apparatus, the combination, with a number of isolated pipes having openings in their sides and provided with feet, of a grating for supporting ice in said pipes, a drip-pan below the grating serving to sustain the feet of the pipes, and annular doors applied to the pipes and serving to control access to their openings, substantially as specified.

GEO. R. WIGHT.

Witnesses:
ARTHUR SELLER,
WM. SHARP.